United States Patent
Bunker et al.

(10) Patent No.: US 10,088,164 B2
(45) Date of Patent: Oct. 2, 2018

(54) INTERNAL THERMAL COATINGS FOR ENGINE COMPONENTS

(71) Applicant: General Electric Company, Schenectady, NY (US)

(72) Inventors: Ronald Scott Bunker, West Chester, OH (US); Jason Randolph Allen, Loveland, OH (US); Robert Charles Groves, II, West Chester, OH (US); Aaron Ezekiel Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 564 days.

(21) Appl. No.: 14/631,929

(22) Filed: Feb. 26, 2015

(65) Prior Publication Data
US 2016/0252250 A1 Sep. 1, 2016

(51) Int. Cl.
*F01D 5/08* (2006.01)
*F23R 3/00* (2006.01)
*F01D 5/28* (2006.01)
*F01D 9/02* (2006.01)
*F01D 9/04* (2006.01)
*F01D 25/24* (2006.01)

(52) U.S. Cl.
CPC .............. *F23R 3/007* (2013.01); *F01D 5/282* (2013.01); *F01D 5/284* (2013.01); *F01D 5/288* (2013.01); *F01D 9/02* (2013.01); *F01D 9/04* (2013.01); *F01D 25/24* (2013.01); *Y02T 50/672* (2013.01)

(58) Field of Classification Search
None
See application file for complete search history.

(56) References Cited

U.S. PATENT DOCUMENTS 6,316,078 B1 * 11/2001 Smialek .................... C23C 4/02
427/248.1
6,767,659 B1 7/2004 Campbell
(Continued)

FOREIGN PATENT DOCUMENTS

WO 2007081347 A2 7/2007

OTHER PUBLICATIONS

European Search Report and Written Opinion issued in connection with corresponding EP Application No. 16155978.6 dated Jul. 25, 2016.

*Primary Examiner* — Logan Kraft
*Assistant Examiner* — Jason Fountain
(74) *Attorney, Agent, or Firm* — General Electric Company; William Andes (57) ABSTRACT

A hot gas path component for an engine may generally include a substrate extending between an outer surface and an inner surface opposite the outer surface. The outer surface may be configured to be exposed to a hot gas path of the engine. In addition, the substrate may be formed from a non-metallic composite material. The hot gas path component may also include a thermal coating disposed on the inner surface of the substrate. The thermal coating may be applied to the inner surface so as to have a non-uniform distribution along at least a portion of the inner surface, wherein the non-uniform distribution provides for change in a thermal gradient experienced across the hot gas path component between the outer and inner surfaces of the substrate.

20 Claims, 9 Drawing Sheets

(56) References Cited

U.S. PATENT DOCUMENTS

| | | | |
|---|---|---|---|
| 7,641,440 B2* | 1/2010 | Morrison | F01D 5/187 415/116 |
| 7,785,076 B2* | 8/2010 | Morrison | C04B 41/009 416/233 |
| 2010/0227146 A1* | 9/2010 | Larose | C23C 4/02 428/220 |
| 2015/0031272 A1 | 1/2015 | Fulton et al. | |

* cited by examiner

INTERNAL THERMAL COATINGS FOR ENGINE COMPONENTS

FIELD OF THE INVENTION

The present subject matter relates generally to engine components and, more particularly, to internal thermal coatings for non-metallic-based components of a gas turbine engine, such as hot gas path components formed from a ceramic matrix composite (CMC) material.

BACKGROUND OF THE INVENTION

In order to increase the efficiency and the performance of gas turbine engines so as to provide increased thrust-to-weight ratios, lower emissions and improved specific fuel consumption, turbine engines are tasked to operate at higher temperatures. As the higher temperatures reach and surpass the limits of the material(s) forming the components positioned within the hot gas path of the engine, particularly components within the combustor and/or turbine section(s) of the engine, new materials must be developed.

As the engine operating temperatures have increased, new methods of cooling the high temperature alloys typically used to form hot gas path components have been developed. For example, ceramic thermal barrier coatings (TBCs) have been applied to the exterior surface of hot gas path components to reduce the heat transfer rate, to provide thermal protection to the underlying metal and to allow the component to withstand higher temperatures. In addition, cooling circuits and/or cooling holes have been introduced to provide improved cooling to hot gas path components. For example, film cooling holes are often provided in turbine blades to enhance the thermal capabilities of such components.

Moreover, ceramic matrix composite (CMC) materials have also been developed as substitutes for high temperature alloys. In many cases, CMC materials provide both temperature and density advantages over metallic materials, thereby making the materials desirable options for manufacturing high temperature, hot gas path components. Due to their high temperature capabilities, CMC-based components can often be used within a gas turbine without the need for supplying a cooling medium within and/or through the components. However, as turbine engine operating temperatures continue to increase, a need exists for providing additional cooling to CMC components. Unfortunately, by exposing the interior surface of a CMC component to a cooling medium (e.g., by using a conventional cooling design), the underlying CMC substrate is subjected to an increased thermal gradient between its interior surface and its exterior surface positioned at or adjacent to the hot gas path of the turbine engine. Such an increased thermal gradient can often result in thermal stresses that exceed the material's capabilities, thereby leading to undesirable component damage.

Accordingly, an internal thermal coating for a non-metallic composite-based component that allows for the thermal gradient between the interior and exterior surfaces of the component to be reduced and/or tailored to the specific cooling requirements of the component would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a hot gas path component for an engine. The hot gas path component may generally include a substrate extending between an outer surface and an inner surface opposite the outer surface. The outer surface may be configured to be exposed to a hot gas path of the engine. In addition, the substrate may be formed from a non-metallic composite material. The hot gas path component may also include a thermal coating disposed on the inner surface of the substrate. The thermal coating may be applied to the inner surface so as to have a non-uniform distribution along at least a portion of the inner surface, wherein the non-uniform distribution provides for change in a thermal gradient experienced across the hot gas path component between the outer and inner surfaces of the substrate.

In another aspect, the present subject matter is directed to a hot gas path component for an engine. The hot gas path component may generally include a substrate extending between an outer surface and an inner surface opposite the outer surface. The outer surface may be configured to be exposed to combustion gases flowing within a hot gas path of the engine and the inner surface may be configured to be exposed to a cooling medium. In addition, the substrate may be formed from a non-metallic composite material. The hot gas path component may also include a thermal coating disposed on the inner surface of the substrate that is formed from a material having a lower thermal conductivity than the non-metallic composite material. Moreover, the thermal coating may provide for a change in a thermal gradient experienced across the hot gas path component between the outer and inner surfaces of the substrate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to internal thermal coatings for engine components, particularly hot gas path components formed from a non-metallic composite material (e.g., a ceramic matrix composite (CMC) material) that have a surface along which a cooling medium, such as air, is directed. In this regard, as described herein, the term "outer surface" will be used to refer to the hot surface of a hot gas path component (i.e., the surface exposed to combustion gases) and the term "inner surface" will be used to refer to the cooler surface of such hot gas path component (i.e., the surface opposite the outer surface that is exposed to a cooling medium). In several embodiments, a thermal coating may be applied to the inner surface of a hot gas path component to allow the thermal gradient between the inner and outer surfaces to be reduced and/or tailored to the specific cooling requirements for the component.

As will be described below, the thermal coating may be formed from a material that has a low coefficient of thermal conductivity or a high coefficient of thermal conductivity based on the desired thermal resistance for the associated component. Similarly, depending on the desired thermal resistance (particularly the desired local thermal resistance), the thermal coating may be applied so as to provide for a uniform or non-uniform coating distribution along the inner surface. Such options for varying the composition and/or application of the thermal coating may generally allow the coating to be utilized as a means for regulating the thermal gradient between the inner and outer surfaces of a hot gas path component, thereby controlling the magnitude of the thermal stress experienced by the component during operation of the gas turbine engine.

It should be appreciated that, in general, the present subject matter will be described herein with reference to internal thermal coatings for hot gas path components of a gas turbine engine. However, in other embodiments, the disclosed thermal coatings may be utilized with hot gas path components of any other suitable engine, such as a locomotive engine or a reciprocating engine.

Figure 1:
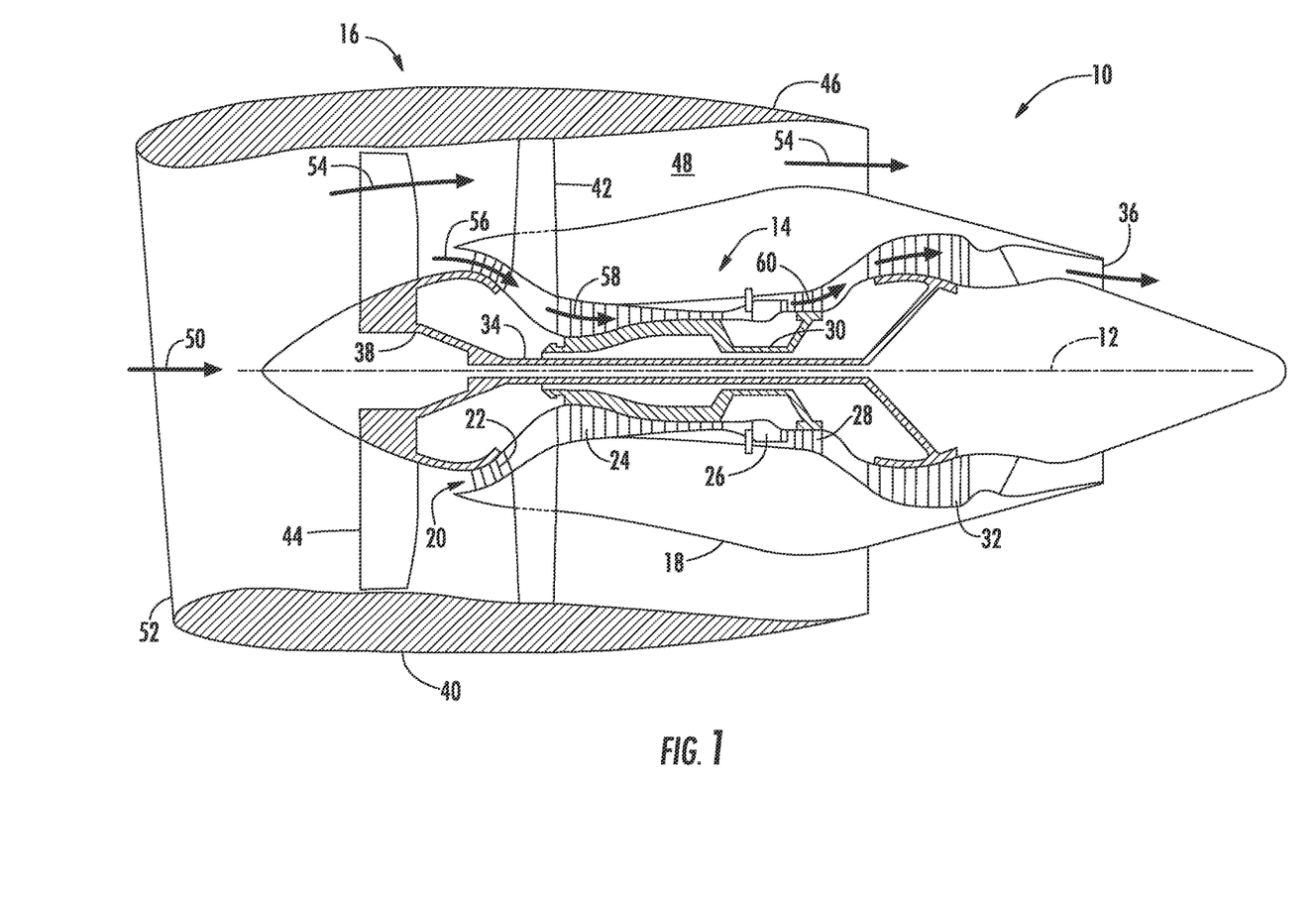
FIG. 1 illustrates a cross-sectional view of one embodiment of a gas turbine engine that may be utilized within an aircraft in accordance with aspects of the present subject matter.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor 38 that configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
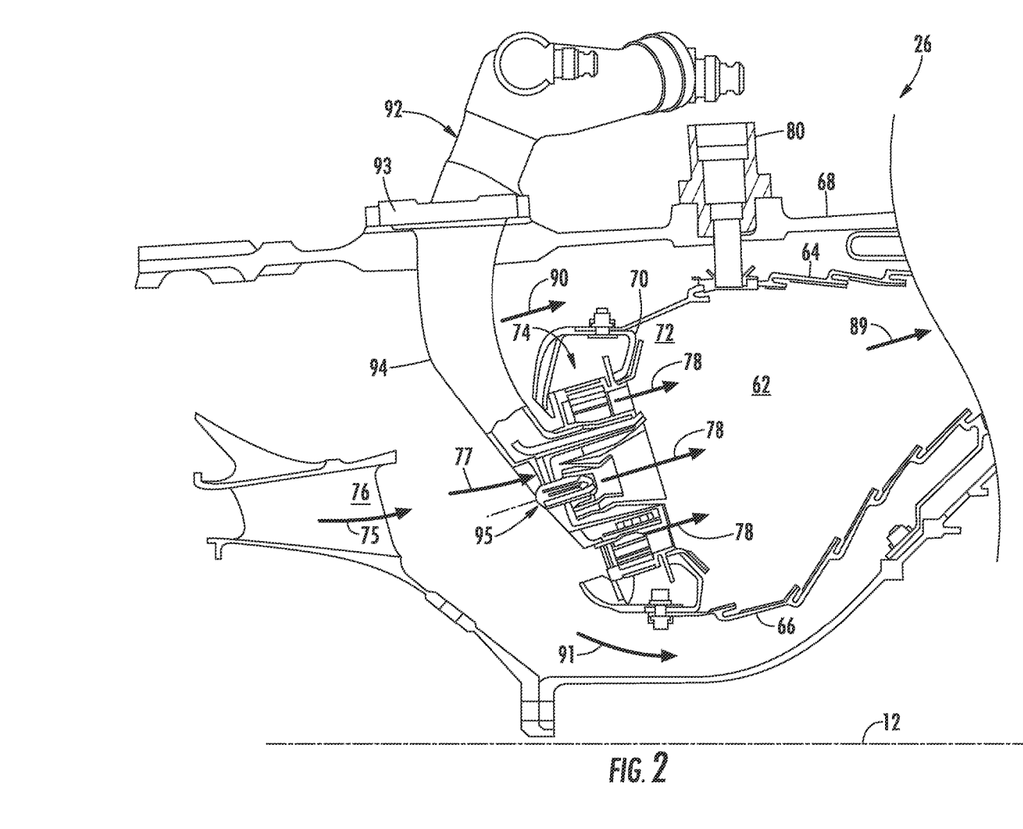
FIG. 2 illustrates a longitudinal, cross-sectional view of one embodiment of a combustor suitable for use within the gas turbine engine shown in FIG. 1.

Referring now to FIG. 2, a longitudinal, cross-sectional view of one embodiment of a combustor 26 suitable for use within the gas turbine engine 10 described above is illustrated in accordance with aspects of the present subject matter. As shown, the combustor 26 may include an annular combustion zone 62 defined between and by annular radially outer and inner liners 64, 66, respectively, circumscribed above the engine's longitudinal axis 12. In general, the outer and inner liners 64, 66 may be located radially inwardly from an annular combination casing 68 configured to extend circumferentially around the outer and inner liners 64, 66. In addition, the combustor 26 may also include an annular dome 70 mounted upstream of the combustion zone 62 that is configured to be coupled to the outer and inner liners 64, 66. As shown in FIG. 2, the dome 70 may define an upstream end 72 of the combustion zone 62. Moreover, a plurality of mixer assemblies 74 (only one of which shown) may be spaced circumferentially around the dome 70.

Additionally, as shown in FIG. 2, the combustor 26 may be configured to receive an annular stream of pressurized compressor discharge air 75 from a discharge outlet 76 of the high pressure compressor 24. A first portion of the compressor discharge air (indicated by arrow 77) flows into the mixer assembly 74, within which fuel is injected and mixed with the pressurized air to form an air-fuel mixture that is subsequently delivered to the combustion zone 62 for combustion thereof. Ignition of the fuel-air mixture (indicated by arrows 78) may be accomplished by a suitable igniter(s) 80 (e.g., one or more igniters 88 extending through the outer liner 64), and the resulting combustion gases (indicated by arrow 89) may flow in an axial direction toward and into the first or high pressure turbine 28 (FIG. 1). Additionally, as shown in FIG. 2, a second portion of the compressor discharge air 80 (indicated by arrow 90) may flow around the outer liner 64 and a third portion of the compressor discharge air 80 (indicated by 91) may flow around the inner liner 66.

Moreover, the combustor 26 may also include a plurality of fuel injectors 92 (one of which is shown), with each fuel injector 92 being fixed and sealed to the combustor casing 68 via a nozzle mount or flange 93. As shown in FIG. 2, the fuel injector 92 may include both a hollow stem 94 formed integral with or fixed to the flange 93 (such as by brazing or welding) and a fuel nozzle assembly 95. In several embodiments, the hollow stem 94 may be configured to support both the fuel nozzle assembly 95 and at least a portion of the mixer assembly 74.

Figure 3:
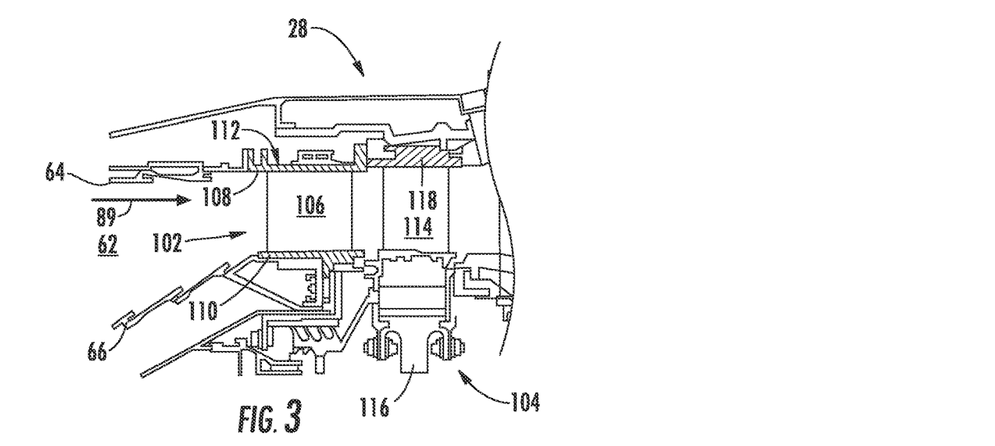
FIG. 3 illustrates a cross-sectional view of one embodiment of a turbine configuration suitable for use within the gas turbine engine shown in FIG. 1.

Referring now to FIG. 3, a partial, cross-sectional view of the first (or high pressure) turbine 28 described above with reference to FIG. 1 is illustrated in accordance with embodiments of the present subject matter. As shown, the first turbine 28 may include a first stage turbine nozzle 102 and a first stage turbine rotor 104. The nozzle 102 may generally be defined by an annular flow channel that includes a plurality of radially-extending, circularly-spaced nozzle vanes 106 (one of which is shown). The vanes 106 may be supported between a number of arcuate outer bands 108 and arcuate inner bands 110. As is generally understood, the vanes 106, outer bands 108 and inner bands 110 may be arranged into a plurality of circumferentially adjoining nozzle segments 112 to form a complete 360 degree assembly, with the outer and inner bands 108, 110 of each nozzle segment 112 generally defining the outer and inner radial flow path boundaries, respectively, for the combustion products flowing through the nozzle 102 along the hot gas path of the engine 10.

Additionally, the first stage turbine rotor 104 may include a plurality of circumferentially spaced rotor blades 114 (only one of which is shown in FIG. 3) extending radially outwardly from a rotor disk 116 that rotates about the centerline axis 12 (FIG. 1) of the engine 10. Additionally, a plurality of arcuate shrouds 118 may be arranged circumferentially in an annular array so as to closely surround the rotor blades 114 and thereby define the outer radially flow path boundary for the combustion products flowing through the turbine rotor 104 along the hot gas path of the engine 10.

During operation, hot gases of combustion (indicated by arrow 89) may flow in an axial direction from the combustion zone 62 of the combustor 26 (FIG. 2) into the annular, first stage turbine nozzle 102. The nozzle vanes 106 of the first stage turbine nozzle 102 may generally be configured to turn or direct the hot gases so that the flow angularly impinges upon the turbine blades 114 of the first stage rotor 104. The flow of hot gases around the annular array of rotor blades 114 may result in rotation of the turbine rotor 104, which may then rotationally drive the shaft (e.g., the first drive shaft 30 shown in FIG. 1) to which the rotor 104 is coupled.

It should be appreciated that, although only the first stage of the high pressure turbine 28 was generally described above, the turbine 28 may also include any number of follow-up stages including any number of corresponding, sequential annular arrays of nozzle vanes and turbine blades. Similarly, the low pressure turbine 32 (FIG. 1) may also include a similar configuration, with one or more stages of sequential annular arrays of nozzle vanes and turbine blades.

As indicated above, the present subject matter is generally directed to an internal thermal coating for a hot gas path component of an engine, such as a gas turbine engine. For purposes of describing the disclosed thermal coating, the present subject matter will generally be described with reference to a turbine blade. However, it should be appreciated that the thermal coating may generally applied to the inner surface of any suitable hot gas component, including blades, vanes, domes, liners, rotor shrouds, nozzle bands, deflectors, heat shields and/or various other turbine components that are exposed to the hot gases of combustion flowing through a gas turbine engine.

Figure 4:
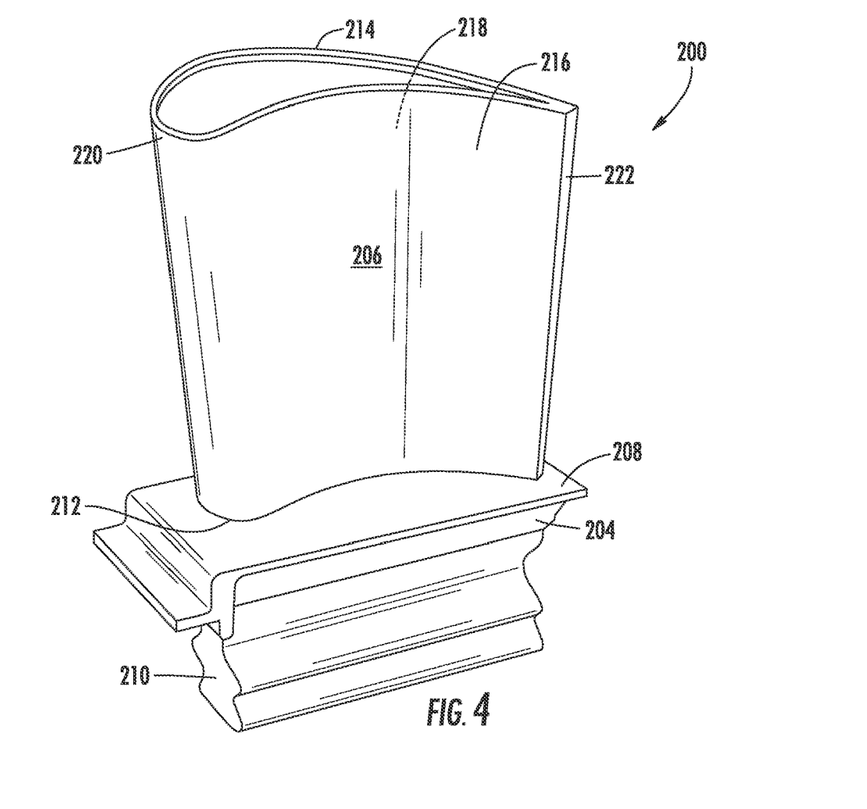
FIG. 4 illustrates a perspective view of one embodiment of a hot gas path component within which the disclosed thermal coating may be applied in accordance with aspects of the present subject matter, particularly illustrating the hot gas path component configured as a turbine blade.
Figures 5, 6:
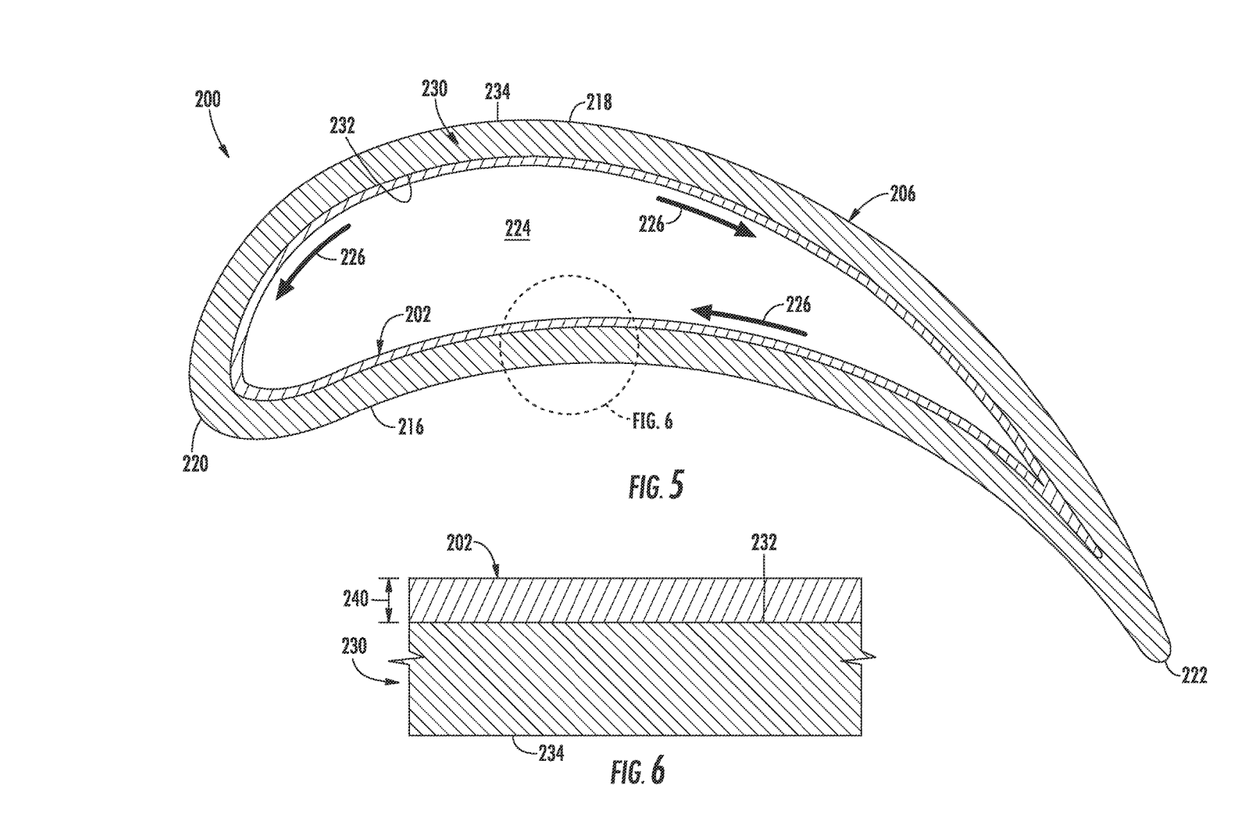
FIG. 5 illustrates a cross-sectional view of the hot gas path component shown in FIG. 4 taken about line 5-5, particularly illustrating a thermal coating applied to the inner surface of the component.
FIG. 6 illustrates a magnified view of the portion of the cross-section shown in FIG. 5 contained within the dashed circle, particularly illustrating an example of a uniform distribution for the thermal coating.

Referring now to FIGS. 4 and 5, one embodiment of a suitable hot gas path component 200 within which an internal thermal coating 202 may be applied is illustrated in accordance with aspects of the present subject matter. Specifically, FIG. 4 illustrates a perspective view of the hot gas path component 200 and FIG. 5 illustrates a cross-sectional view of the component 200 shown in FIG. 4 taken about line 5-5. As shown in FIGS. 4 and 5, the hot gas path component 200 is configured as a turbine blade. For example, the blade may correspond to the turbine blade 114 described above with reference to FIG. 3 and/or any other suitable turbine blade of a gas turbine engine.

In general, the turbine blade 200 may include a shank portion 204 and a hollow or substantially hollow airfoil 206 extending from a substantially planar platform 208. The platform 208 may generally serve as the radially inward boundary for the hot gases of combustion flowing past the blade 200. The shank portion 204 of the blade 200 may generally be configured to extend radially inwardly from the platform 206 and may include a root structure 210, such as a dovetail, configured to secure the blade to a rotor disk of the turbine engine 10.

As shown in FIG. 4, the airfoil 206 may generally extend radially outwardly from the platform 208 and may include an airfoil base 212 disposed at the platform 208 and an airfoil tip 214 disposed opposite the airfoil base 212. Thus, the airfoil tip 214 may generally define the radially outermost portion of the blade 200. The airfoil 206 may also include a pressure side 216 and a suction side 218 extending between a leading edge 220 and a trailing edge 222. The pressure side 216 may generally define the aerodynamic, concave portion of the airfoil 206 whereas the suction side 218 may generally define by the aerodynamic, convex portion of the airfoil 206

Additionally, as particularly shown in FIG. 5, the interior, hollow portion of the airfoil 206 may be configured to define an airfoil cooling circuit 224 for flowing a cooling medium (as indicated by arrows 226) (e.g., air, water, steam or any other suitable fluid), within the interior of the airfoil 206. For purposes of illustration, the airfoil cooling circuit 224 has been shown simply as being formed by a single interior cavity defined within the airfoil 206. However, it should be appreciated that, in general, the airfoil cooling circuit 224 may have any suitable configuration known in the art. For example, in several embodiments, the airfoil cooling circuit 224 may include a plurality of separate channels extending radially within the airfoil 206, such as a plurality of channels forming a serpentine-like flow path throughout the airfoil 206.

Moreover, as shown in FIG. 5, the airfoil 206 may generally be formed by a substrate 230 extending between an inner surface 232 and an outer surface 234 of the airfoil 206. The inner surface 232 may generally be referred to as the "cooler" surface due its exposure to the cooling medium 226 provided via the airfoil cooling circuit 224 while the outer surface 234 may generally be referred to as the "hot" surface due to its exposure to the combustion gases flowing across the blade 200 along the hot gas path of the gas turbine engine 10. As indicated above, the substrate 230 may generally experience a very high thermal gradient due to the significant differences in temperature between the inner and outer surfaces 232, 234. As will be described in greater detail below, the disclosed thermal coating 202 may be applied to the inner surface 232 of the substrate 230 to reduce or otherwise regulate the thermal gradient experienced between the inner and outer surfaces 232, 234 of the substrate 230.

It should be appreciated that the substrate 230 may generally be formed from any suitable material. However, in several embodiments, the substrate 230 may be formed from a non-metallic composite material. For instance, in a particular embodiment, the substrate 230 may be formed from a ceramic matrix composite (CMC) material. In such an embodiment, the CMC material used to form the substrate 230 may generally correspond to any suitable CMC material known in the art and, thus, may generally include a ceramic matrix having a suitable reinforcing material incorporated therein to enhance the material's properties (e.g., the material strength and/or the thermo-physical properties). In one embodiment, the CMC material used may be configured as a continuous fiber reinforced CMC material. For example, suitable continuous fiber reinforced CMC materials may include, but are not limited to, CMC materials reinforced with continuous carbon fibers, oxide fibers, silicon carbide monofilament fibers and other CMC materials including continuous fiber lay-ups and/or woven fiber preforms. In other embodiments, the CMC material used may be configured as a discontinuous reinforced CMC material. For instance, suitable discontinuous reinforced CMC materials may include, but are not limited to, particulate, platelet, whisker, discontinuous fiber, in situ and nano-composite reinforced CMC materials.

In other embodiments, the substrate 230 may be formed from any other suitable non-metallic composite material. For instance, in an alternative embodiment, the substrate 230 may be formed from an oxide-oxide high temperature composite material.

It should be appreciated that, although not shown herein, a suitable exterior coating may also be applied around the outer perimeter of the substrate 230. For example, as is generally understood, an environmental coating, such as a thermal-barrier coating (TBC), may be applied around the perimeter of the substrate 230 to provide enhanced thermal protection to the hot gas path component 200. In such an embodiment, the outer surface 234 described herein may generally correspond to the exterior surface of the coating as opposed to the exterior surface of the substrate 230.

Additionally, it should be appreciated that the substrate 230 described herein may have any suitable configuration and/or construction that allows it to function as the primary substrate for a hot gas path component. For example, although the substrate 230 is shown in various embodiments herein as defining a constant thickness, the substrate 230 may have a varying thickness between its inner and outer surfaces 232, 234.

As particularly shown in FIGS. 5 and 6, in several embodiments, a thermal coating 202 may be applied to the inner surface 232 of the substrate 230. As indicated above, the thermal coating 202 may generally be applied to the inner surface 232 in order to reduce and/or otherwise control the magnitude of the thermal gradient experienced between the inner and outer surfaces 232, 234 of the substrate 230. For instance, as will be described below, the thermal coating 202 may, in several embodiments, be formed from a material having a relatively low coefficient of thermal conductivity. As such, by applying the thermal coating 202 onto the inner surface 232 (e.g., in a uniform manner), the cooling effectiveness of the cooling medium 226 supplied within the hot gas path component 200 may be reduced significantly, thereby resulting in an increase in the temperature of the inner surface 232 of the substrate 230 and, thus, a corresponding decrease in the thermal gradient through the substrate 230.

Moreover, in several embodiments, the thermal coating 202 may also be applied to the inner surface 232 in a non-uniform manner to allow both the cooling effectiveness of the cooling medium 226 supplied within hot gas path component 200 and the resulting thermal gradient through the substrate 230 to be specifically tailored to meet the cooling requirements for the component 200. For instance, certain areas within a hot gas path component 200 may be more susceptible to damage due to the thermal stresses associated with high temperature gradients across the substrate 230. For such areas, the thermal coating 202 may be applied in a manner that significantly reduces the cooling effectiveness of the cooling medium 226 supplied within the component 200. However, other areas within the hot gas path component 200 may be less susceptible to thermally-induced stresses. In these areas, the thermal coating 202 may not be applied at all or the coating 200 may be applied in a manner that either minimizes the reduction in the cooling effectiveness of the cooling medium 226 or actually enhances the cooling effectiveness of the cooling medium 226.

In general, the material used to form the thermal coating 202 may depend on the specific application and/or the desired heat transfer through the coating 202. However, as indicated above, the thermal coating 202 may, in several embodiments, be formed from a material having a relatively low coefficient of thermal conductivity such that the coating 202 may be used to reduce the cooling effectiveness of the cooling medium 226 supplied within the hot gas path component 200. For example, suitable materials may include, but are not limited to, materials typically utilized in environmental barrier coatings (e.g., rare earth disilicates and/or rare earth monosilicates) and/or materials typically utilized for thermal barrier coatings (e.g., alumina and/or zirconia partially or fully stabilized by yttrium oxide, magnesium oxide and/or any other suitable noble metal oxides). Additionally, in one embodiment, the specific material(s) used to form the thermal coating 202 may be selected so as to have a thermal conductivity that is less than the thermal conductivity of the associated substrate 230. For example, when the substrate 230 comprises a CMC material, the material forming the thermal coating 202 may have a thermal conductivity that is less than the thermal conductivity of the CMC material, such as a thermal conductivity of less than about 7 Btu/(hr-ft-° F.) or than about 4 Btu/(hr-ft-° F.) or less than about 1 Btu/(hr-ft-° F.) or less than about 0.5 Btu/(hr-ft-° F.) and any other subranges therebetween.

Alternatively, the thermal coating 202 may be formed from any other suitable materials, including materials having a relatively high coefficient of thermal conductivity. For instance, as indicated above, it may be desirable for the thermal coating 202 to minimize the reduction in the cooling effectiveness of the cooling medium 226 supplied within the hot gas path component 220 or actually enhance such effectiveness. In such instance, the material used to form the thermal coating 202 may be selected to provide the desired heat transfer from the cooling medium 226 to the underlying substrate 230.

Moreover, as particularly shown in FIGS. 5 and 6, in several embodiments, the thermal coating 202 may be applied to the inner surface 232 of the substrate 230 so as to provide a uniform distribution of the coating 202 across the inner surface 232. For example, as shown in FIG. 6, the thermal coating 202 may be applied to the inner surface 232 such that a thickness 240 of the coating 202 is constant or substantially constant across all or a portion of the inner surface 232. Such a uniform coating may, for instance, allow for a substantially uniform temperature gradient to be achieved between the inner and outer surfaces 232, 234 across the entirety of the substrate 230.

It should be appreciated that, as used herein, the thickness 240 of the thermal coating 202 may be considered to be "substantially constant" when the variation of the thickness 240 across the portions of the inner surface 232 along which coating 202 is applied is less than 20%, such as a thickness variation of less than 10% or less than 5%. This tolerance may generally be selected to accommodate slight variations in the thickness 240 occurring due to the application process used to coat the inner surface 232 of the substrate 230.

Alternatively, the thermal coating 202 may be applied to the inner surface 232 of the substrate 230 so as to provide a non-uniform distribution of the coating 202 across all or at least a portion of the inner surface 232. Specifically, in several embodiments, the thermal coating 202 may be applied so as to define differing local thicknesses and/or particular patterns that provide for a large range of cooling effectiveness to be obtained within the hot gas component 200, thereby allowing for the resulting thermal gradient through the substrate 230 to be tailored to match the local cooling requirements for the substrate 230. For example, as indicated above, it may be desirable for certain areas along the inner surface 232 of the substrate 230 to have additional thermal resistance to the cooling medium 226 and for other areas to have little or no additional thermal resistance to the cooling medium 226. In such instance, the thermal coating 202 may be applied along the inner surface 232 in a non-uniform manner to match the desired cooling requirements for the hot gas path component 200.

Referring now to FIGS. 7-13, various embodiments of non-uniform applications of the disclosed thermal coating 202 are illustrated in accordance with aspects of the present subject matter. It should be appreciated that the embodiments shown in FIGS. 7-13 are simply provided as examples of manners in which the thermal coating 202 may be applied along the inner surface 232 of the substrate 230 of a hot gas path component 200 to provide a non-uniform distribution of the coating 202 for purposes of tailoring the internal cooling effectiveness of the component 200. As such, those of ordinary skill in the art, using the disclosure provided herein, should appreciate that various other non-uniform applications may also be utilized to meet the specific local cooling requirements of a given hot gas path component.

Figure 7:
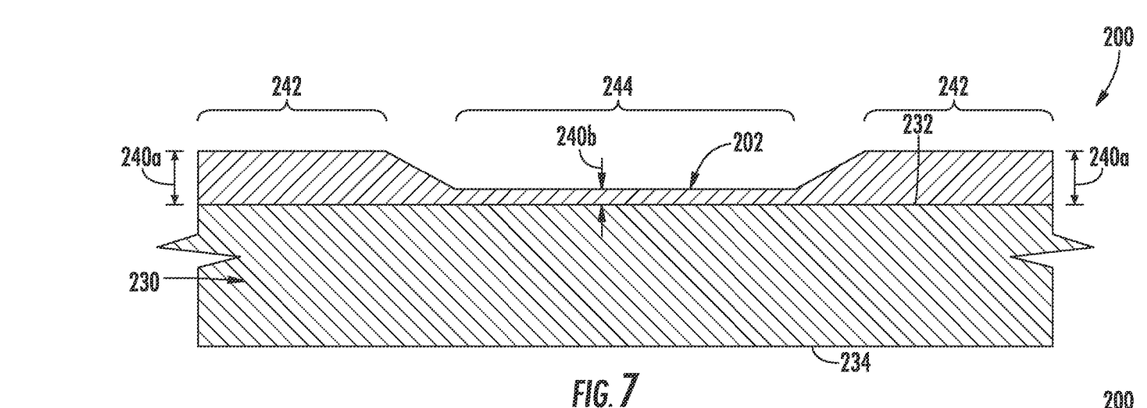
FIG. 7 illustrates a cross-sectional view of another embodiment of a thermal coating applied to the inner surface of the hot gas path component, particularly illustrating the thermal coating defining a varying thickness along the inner surface.
Figure 8:
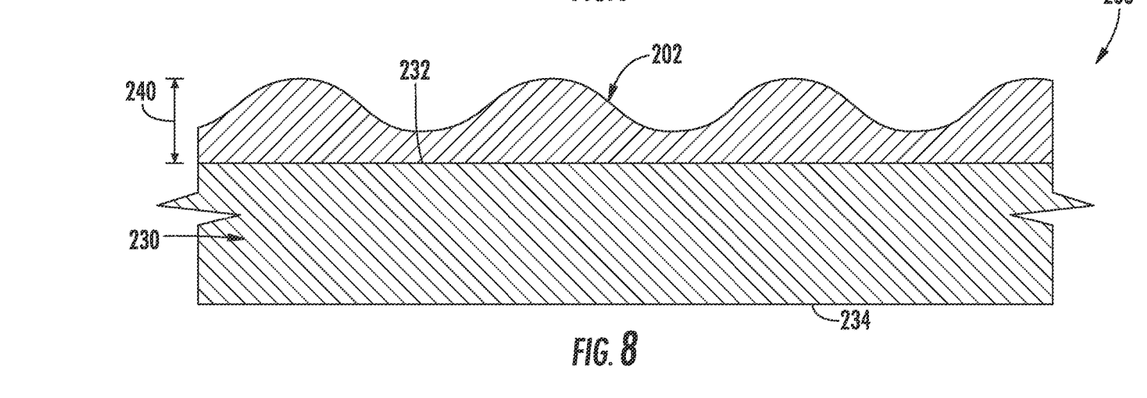
FIG. 8 illustrates a cross-sectional view of a further embodiment of a thermal coating applied to the inner surface of the hot gas path component, particularly illustrating the thermal coating defining wavy or undulating cross-sectional profile with a continuously varying thickness along the inner surface.

As shown in FIGS. 7 and 8, in one embodiment, the coating 202 may be applied to the inner surface 232 of the substrate 230 so as to have a varying thickness. For example, as shown in FIG. 7, the coating 202 has been applied so as to define a first thickness 240A along first local portions 242 of the inner surface 232 and a reduced, second thickness 240B along a second local portion 244 of the inner surface 232. In such instance, the second local portion 244 of the inner surface 232 may, for example, correspond to an area of the substrate 230 at which the internal cooling effectiveness of the hot gas path component 200 is desired to be greater than the cooling effectiveness of the surrounding first local portions 232. Similarly, as shown in FIG. 8, the coating 202 may be applied to the inner surface 232 so as to define a continuously variable thickness 240 along the inner surface 232. Specifically, in the illustrated embodiment, the thermal coating 202 defines a wavy or undulating cross-sectional profile such that the thickness 240 of the coating 202 varies continuously along the inner surface 232.

It should be appreciated that, as used herein, the thermal coating 202 may be configured to define a varying or variable thickness when the variation of the thickness across the portions of the inner surface 232 along which the coating 202 is applied is greater than 20%, such as a thickness variation of greater than 50% or greater than 100% or greater than 200%

Figure 9A:
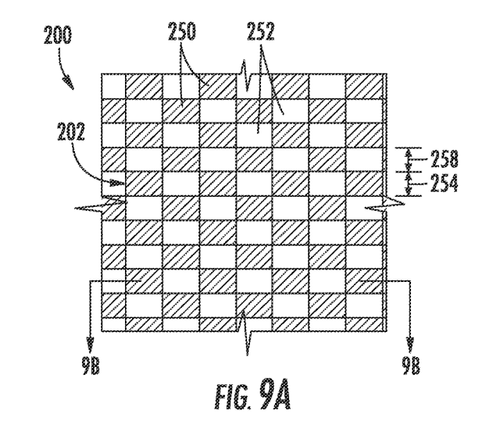
FIG. 9A illustrates a top view of yet another embodiment of a thermal coating applied to the inner surface of the hot gas path component, particularly illustrating the thermal coating applied to the inner surface according to a honeycomb or checkerboard pattern.
Figure 9B:
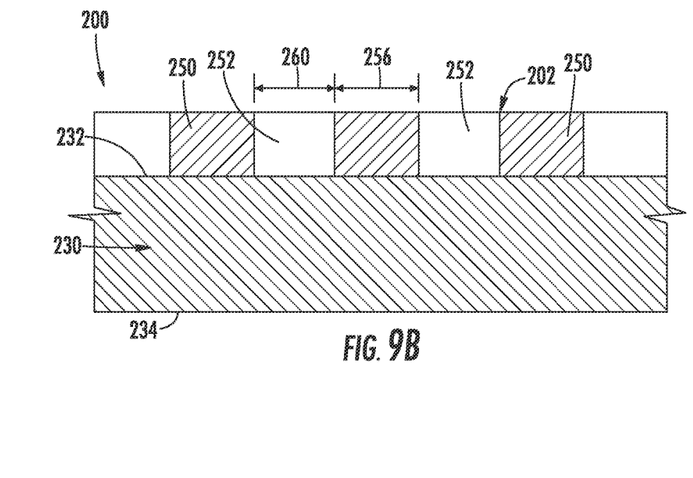
FIG. 9B illustrates a cross-sectional view of the gas turbine component shown in FIG. 9A taken about line 9B-9B.

Additionally, as indicated above, the coating 202 may also be applied onto the inner surface 232 according to any suitable pattern so as to provide a non-uniform coating distribution. For example, FIGS. 9A and 9B illustrate one embodiment of a suitable pattern that may be utilized when applying the disclosed thermal coating 202 to the inner surface 232 of a substrate 230. As shown, the thermal coating 202 has been applied to the inner surface 232 in a checkerboard or honeycomb pattern such that the substrate 230 includes both coated and non-coated portions 250, 252 along the inner surface 232. In such an embodiment, the pattern may be applied such that the coated and non-coated portions 250, 252 span across or cover the same or substantially the same area along the inner surface 232. For example, as shown in FIGS. 9A and 9B, each coated portion 250 may define a height 254 and a width 256 that is the same or substantially the same as a corresponding height 258 and width 260 defined by each non-coated portion 252. It should be appreciated that the transitions between the coated and non-coated portions 250, 252 along the inner surface 232 may be formed so as to be abrupt or sudden (e.g., by using masking methods) or may be tapered to provide smoother transitions.

Figure 10A:
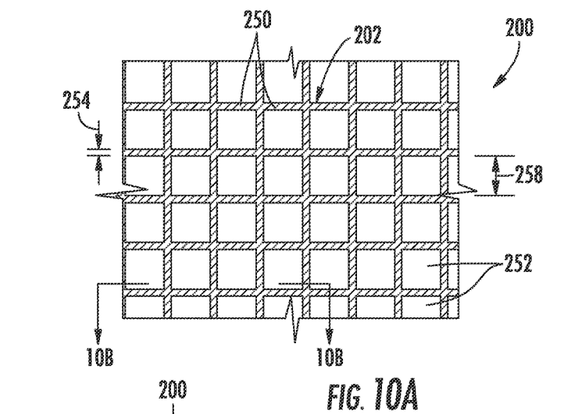
FIG. 10A illustrates a top view of a further embodiment of a thermal coating applied to the inner surface of the hot gas path component, particularly illustrating the thermal coating applied to the inner surface according to a grid pattern.
Figure 10B:
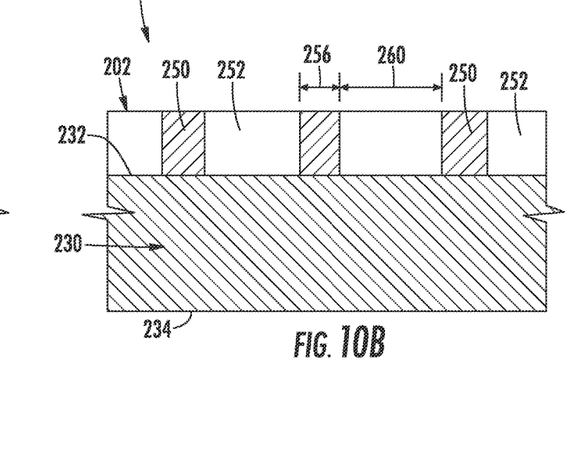
FIG. 10B illustrates a cross-sectional view of the gas turbine component shown in FIG. 10A taken about line 10B-10B.

Alternatively, the height 254 and/or width 256 of the coated portions 250 may differ from the height 258 and/or width 260 of the non-coated portions 252. For example, FIGS. 10A and 10B illustrate another embodiment of a suitable pattern that may be utilized when applying the disclosed thermal coating 202 to the inner surface 232 of a substrate 230. As shown, as opposed to the checkerboard or honeycomb pattern described above, the thermal coating 202 has been applied in a grid pattern such that coated and non-coated portions 250, 252 span across or cover differing areas along the inner surface 232. For example, as shown in FIGS. 10A and 10B, the coated portions 250 of the substrate 230 each define a height 254 and a width 256 that is less than a corresponding height 258 and width 260 defined by each non-coated portion 252. As such, the non-coated portions 252 may cover a larger area across the inner surface 232 of the substrate 230 than the coated portions 250. However, in alternative embodiments, the thermal coating 202 may be applied such that the coated portions 250 cover a larger area across the inner surface 232 than the non-coated portions 252.

Figure 11A:
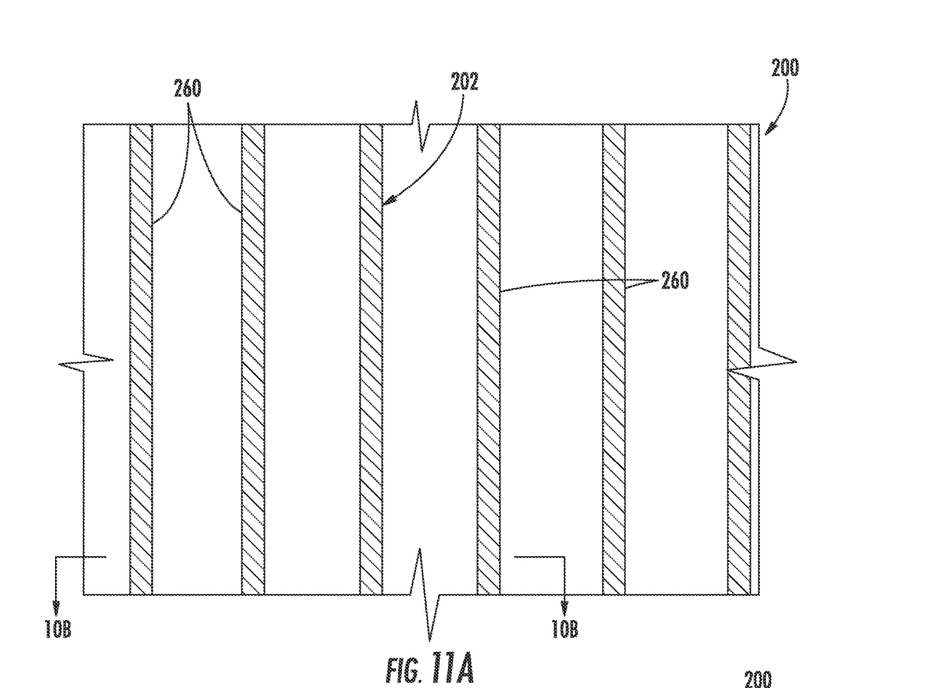
FIG. 11A illustrates a top view of yet another embodiment of a thermal coating applied to the inner surface of the hot gas path component, particularly illustrating the thermal coating applied to the inner surface according to a striped pattern.
Figure 11B:
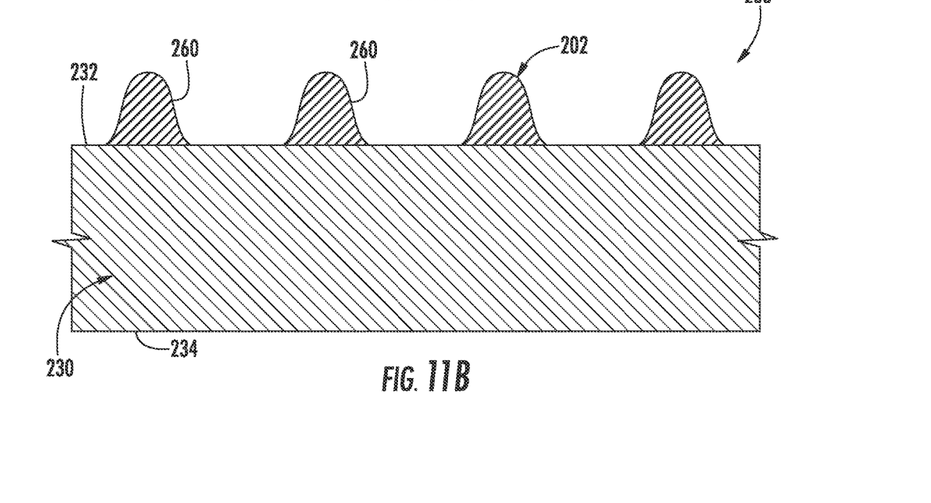
FIG. 11B illustrates a cross-sectional view of the gas turbine component shown in FIG. 11A taken about line 11B-11B.

Referring now to FIGS. 11A and 11B, a further embodiment of a suitable pattern that may be utilized when applying the disclosed thermal coating 202 to the inner surface 232 of a substrate 230 is illustrated in accordance with aspects of the present subject matter. As shown, the thermal coating 202 has been applied in a striped pattern such that the substrate 230 includes a plurality of spaced apart coated portions defining lines or stripes 260 running lengthwise along the inner surface 232. For example, as shown in the illustrated embodiment, the coated portions define stripes 260 running generally parallel to one another so as to form parallel extending, spaced apart turbulators along the inner surface 232. However, in other embodiments, the lines or stripes 260 formed by the coating 202 may be oriented relative to one another at any other suitable angle.

Figure 12A:
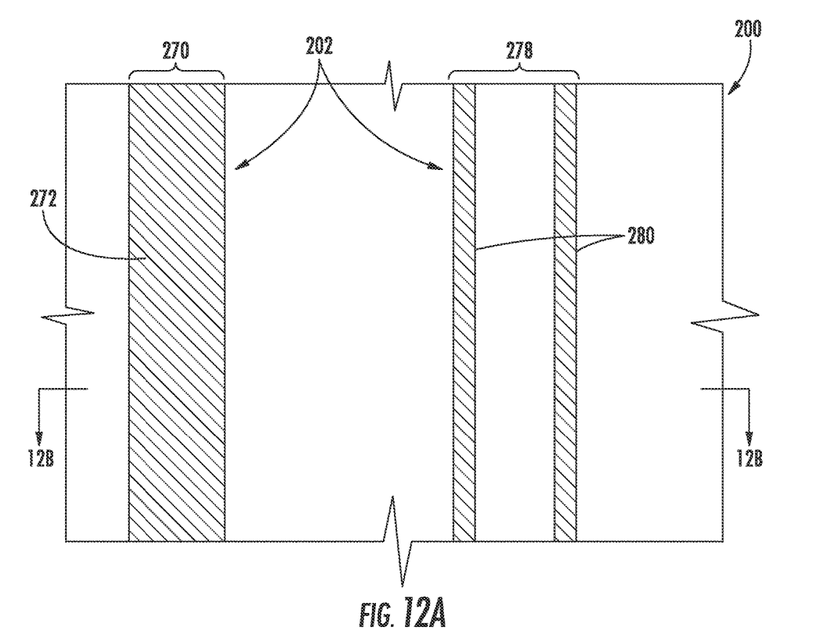
FIG. 12A illustrates a top view of another embodiment of a thermal coating applied to the inner surface of the hot gas path component, particularly illustrating the thermal coating applied to the inner surface at one or more discrete locations.
Figure 12B:
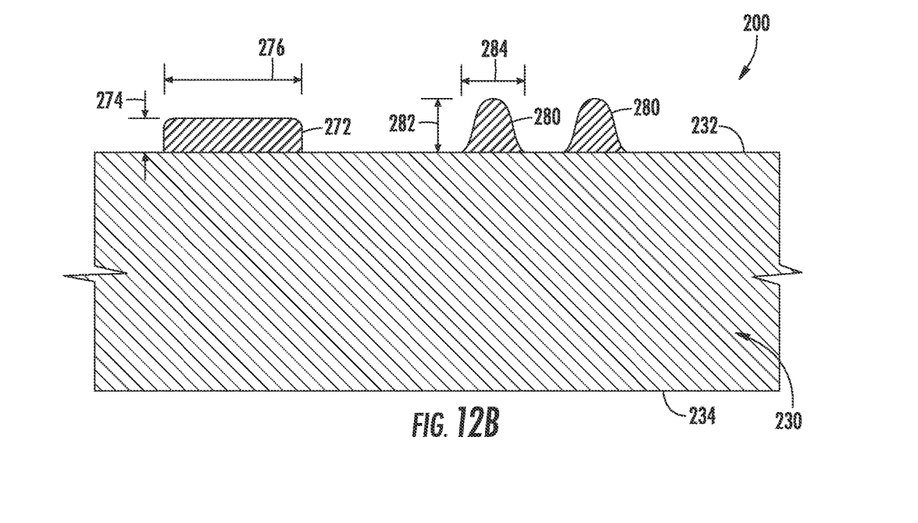
FIG. 12B illustrates a cross-sectional view of the gas turbine component shown in FIG. 12A taken about line 12B-12B.

Moreover, as an alternative to applying the thermal coating 202 along the inner surface 232 according to a pattern, the coating 202 may simply be applied at one or more discrete areas or locations on the inner surface 232 so as to provide the desired, non-uniform coating distribution. For instance, FIGS. 12A and 12B illustrate one example of a non-uniform coating distribution in which the coating 202 has been applied, as desired, to a plurality of discrete locations along the inner surface 232. Specifically, as shown in FIGS. 12A and 12B, the coating 202 has been applied along a first portion 270 of the inner surface 232 so as to define a generally uniform coating 272 having a given thickness 274 and width 276. Similarly, the coating 202 has been applied along a second portion 278 of the inner surface 232 so as to define separate coating stripes 280, with each stripe 280 defining a thickness 282 and width 284 that differs from the thickness 274 and width 276 of the coating 202 applied across the first portion 270 of the inner surface 232. As indicated above, such discrete applications of the thermal coating 202 may be used to specifically tailor the local cooling effectiveness within a hot gas path component 200 in order to meet desired cooling requirements.

It should be appreciated that the disclosed thermal coating 202 may be configured to be applied to any internal surface. Thus, although the coatings 202 were generally described above with reference to FIGS. 5-12B as being applied to a flat inner surface 232 of a hot gas path component 200, one of ordinary skill in the art should readily appreciate that the coatings 202 may also be applied to non-flat inner surfaces, including any surface features defined by the inner surface 232 of a hot gas path component 200. For example, the inner surface of a given hot gas path component may define bumps, ribs, channels, waves, fillets, corners and/or any other suitable surface features. In such instance, the disclosed thermal coating 202 may be selectively applied across and/or within such surface feature(s), as desired, to specifically tailor the local cooling effectiveness within the hot gas path component 200.

Figure 13:
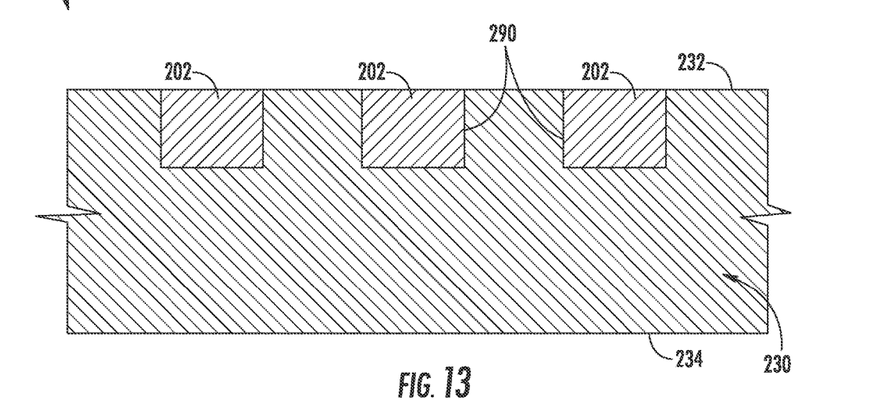
FIG. 13 illustrates another example cross-sectional view of a gas turbine component, particularly illustrating a thermal coating applied within a channel defined by the inner surface of the component.
Figure 14:
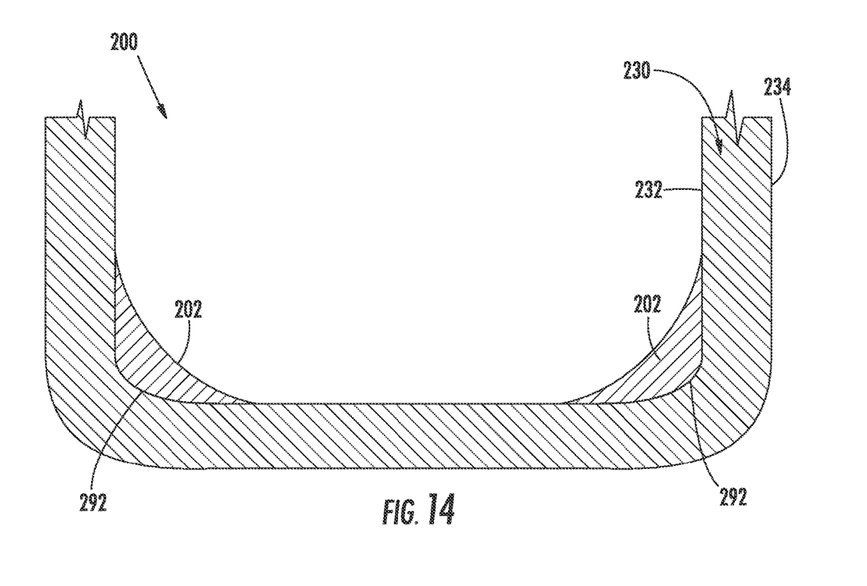
FIG. 14 illustrates a further example cross-sectional view of a gas turbine component, particularly illustrating a thermal coating applied across a filter or corner defined by the inner surface of the component.

For instance, FIGS. 13 and 14 illustrate examples of surface features across and/or within which the disclosed thermal coating 202 may be applied. As shown in FIG. 13, the inner surface 232 of the substrate 230 defines a plurality of channels 290. In such instance, the coating 202 may, for example, be applied within the channels 290 to provide the substrate 230 with a specific thermal response to the cooling medium supplied along the inner surface 232. For example, due to the reduced overall thickness of the substrate 230 at the locations of the channels 290, it may be desirable to fill the channels 290 with a low thermal conductivity coating to provide increased thermal resistance within the channels 290. Similarly, as shown in FIG. 14, the substrate 230 is shaped such that fillets 292 are defined along the inner surface 232 of the substrate 230. In such an embodiment, the thermal coating 202 may, for example, be applied along the fillets 292 to provide for a specific thermal response along the corner areas of the substrate 230.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hot gas path component for an engine, the hot gas path component comprising:
 a substrate extending between an outer surface and an inner surface opposite the outer surface, the outer surface being configured to be exposed to a hot gas path of the gas turbine engine, the substrate being formed from a non-metallic composite material;
 a thermal coating disposed on the inner surface of the substrate, the thermal coating being applied to the inner surface so as to have a non-uniform distribution along at least a portion of the inner surface,
 wherein the non-uniform distribution provides for a change in a thermal gradient experienced across the hot gas path component between the outer and inner surfaces of the substrate.

2. The hot gas path component of claim 1, wherein the thermal coating defines a varying thickness along the at least a portion of the inner surface.

3. The hot gas path component of claim 1, wherein the thermal coating is applied according to a pattern along the at least a portion of the inner surface.

4. The hot has path component of claim 3, wherein the pattern corresponds to one of a checkerboard pattern, a grid pattern or a striped pattern.

5. The hot gas path component of claim 1, wherein the thermal coating is applied at discrete locations along the at least a portion of the inner surface.

6. The hot gas path component of claim 1, wherein the inner surface defines a surface feature, the thermal coating being applied within or across the surface feature.

7. The hot gas path component of claim 1, wherein the thermal coating is formed from a material having a lower thermal conductivity than the non-metallic composite material.

8. The hot gas path component of claim 1, wherein the non-metallic composite material corresponds to a ceramic matric composite material.

9. The hot gas path component of claim 1, wherein the hot gas path component corresponds to one of a blade, a vane, a liner, a dome, a nozzle band, a rotor shroud, a deflector or a heat shield of a gas turbine engine.

10. A hot gas path component for an engine, the hot gas path component comprising:
 a substrate extending between an outer surface and an inner surface opposite the outer surface, the outer surface being configured to be exposed to combustion gases flowing within a hot gas path of the engine and the inner surface being configured to be exposed to a cooling medium, the substrate being formed from a non-metallic composite material;
 a thermal coating disposed on the inner surface of the substrate, the thermal coating being formed from a material having a lower thermal conductivity than the non-metallic composite material,
 wherein the thermal coating provides for a change in a thermal gradient experienced across the hot gas path component between the outer and inner surfaces of the substrate.

11. The hot gas path component of claim 10, wherein the thermal coating is applied to the inner surface so as to have a uniform distribution along at least a portion of the inner surface.

12. The hot gas path component of claim 11, wherein the thermal coating defines a substantially constant thickness along the at least a portion of the inner surface.

13. The hot gas path component of claim 10, wherein the thermal coating is applied to the inner surface so as to have a non-uniform distribution along at least a portion of the inner surface.

14. The hot gas path component of claim 13, wherein the thermal coating defines a varying thickness along the at least a portion of the inner surface.

15. The hot gas path component of claim 13, wherein the thermal coating is applied according to a pattern along the at least a portion of the inner surface.

16. The hot gas path component of claim 15, wherein the pattern corresponds to one of a checkerboard pattern, a grid pattern or a striped pattern.

17. The hot gas path component of claim 13, wherein the thermal coating is applied at discrete locations along the at least a portion of the inner surface.

18. The hot gas path component of claim 10, wherein the inner surface defines a surface feature, the thermal coating being applied within or across the surface feature.

19. The hot gas path component of claim 10, wherein the non-metallic composite material corresponds to a ceramic matric composite material.

20. The hot gas path component of claim 10, wherein the hot gas path component corresponds to one of a blade, a vane, a liner, a dome, a nozzle band, a rotor shroud, a deflector or a heat shield of a gas turbine engine.

* * * * *